April 15, 1969 P. G. J. BARTEN 3,439,207

COLOR TUBE WITH SHADOW MASK APERTURES AND COLOR DOTS RELATED TO PERMIT USE IN SYSTEMS HAVING DIFFERENT NUMBERS OF SCANNING LINES

Filed July 7, 1967

INVENTOR.
PIET G. J. BARTEN
BY
Frank R. Trifari
AGENT

United States Patent Office 3,439,207

Patented Apr. 15, 1969

3,439,207

COLOR TUBE WITH SHADOW MASK APERTURES AND COLOR DOTS RELATED TO PERMIT USE IN SYSTEMS HAVING DIFFERENT NUMBERS OF SCANNING LINES

Piet Gerard Joseph Barten, Emmasingel, Eindhoven, Netherlands, assignor to North American Philips Company Inc., New York, N.Y., a corporation of Delaware Filed July 7, 1967, Ser. No. 651,917
Claims priority, application Netherlands, July 9, 1966, 6609667
Int. Cl. H01j 29/32
U.S. Cl. 313—92 3 Claims

ABSTRACT OF THE DISCLOSURE

A cathode-ray tube for reproducing color television images adapted for use with systems employing different line frequencies in which the lines of phosphors on the display screen and the apertures on the color selection electrode have a variable spacing.

Figure 1:
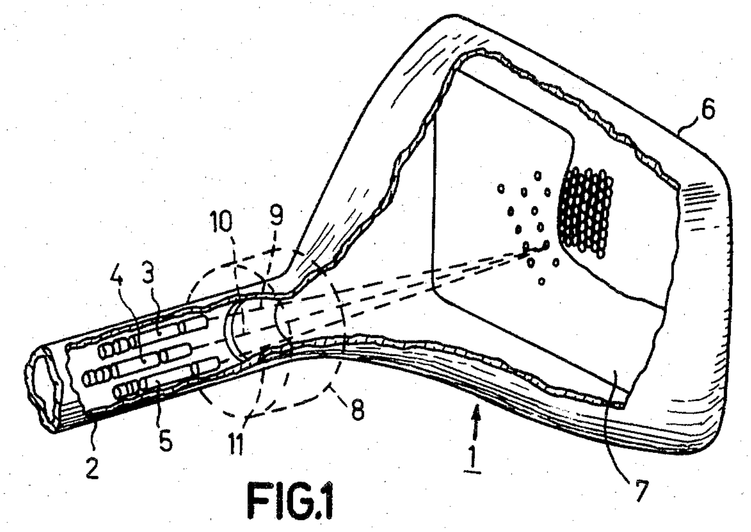

The invention relates to a cathode-ray tube for displaying color pictures which is provided with at least one electron gun producing a number of electron beams which scan in lines a color selection electrode having systematically arranged apertures and then strike parts of the display screen. In such a cathode-ray tube, each electron beam causes a given luminescent substance provided on the display screen of the tube to luminesce and the color selector (generally referred to as the "mask") prevents these electrons from reaching one of the other luminescent substances.

It has been found that during operation of the tube, disturbing moire patterns may occur due to interference between the pattern of lines of the image and the pattern of apertures of the mask. More particularly this disturbance arises with given ratios of the distance between two successive scanning lines on the screen to the distance between two successive apertures in the mask. Since the distance between two successive scanning lines is a function of the height of the display screen, with a cathode-ray tube of given dimensions, the distance between two successive apertures in the mask may be chosen so that disturbing moire patterns do not occur.

However, the distance between two successive scanning lines also depends upon the information transmission system i.e., upon the number of scanning lines for each image. As a result, in the same cathode-ray tube, no disturbing moire patterns occur with one number of scanning lines per image, whereas these patterns do occur with another number of scanning lines per image.

It is a principal object of this invention to provide a cathode-ray tube for reproducing color images adapted for use with information transmission systems employing different line frequencies without given rise to disturbing moire pattern.

This and other objects of the invention will appear as the specification progresses. According to the invention, the quotient of the distance between two successive scanning lines on the screen and the distance on the screen between the projection of an aperture in one scanning line and the projection of an aperture in the succeeding scanning line in the color selection electrode of a cathode-ray tube for reproducing color images lies for at least two distances between two successive scanning lines, which are different due to the different number of scanning lines per image, between $$\frac{4n-3}{16 \cos \alpha}$$

and $$\frac{4n-1}{16 \cos \alpha}$$

$n$ being a natural number and $\alpha$ representing the minimum angle between the direction at right angles to the scanning lines and the direction of the distance on the screen between the projections of two successive apertures in the color selection electrode. Particularly favorable results are obtained if the quotient is approximately $$\frac{1}{8 \cos \alpha}$$

or an odd multiple of $$\frac{1}{8 \cos \alpha}$$

"Projection" is to be understood herein to mean projection by electrons from the deflection center. In cathode-ray tubes, the construction of the mask is generally such that the apertures lie in vertical rows so that, the scanning lines being horizontal, the said minimum angle is 0° and the said limits are simplified to $4n-3/16$ and $4n-1/16$. The quotient is then preferably approximately ⅛ or an odd multiple thereof. The cathode-ray tubes in accordance with the invention have the advantage that the tube manufacturer can manufacture one kind of tube which can be used by manufacturers of color television apparatus operating with different numbers of scanning lines per image. The invention can be used especially if the distance between two successive scanning lines is different owing to the use of the C.C.I.R. system, the British system and the French system. The territories in which these systems are used are comparatively close to each other, so that the reception of color television transmissions according to different systems will occur more frequently, while these territories are commercially more strongly committed to each other.

The invention will now be described more fully with reference to the following examples.

With the R.T.M.A. system (used in the U.S.A., Canada and Japan), the number of lines of a complete image is 525. Owing to frame blanking during the fly-back of the electron beam, approximately 39 lines do not contribute to the image production. Moreover, due to an overscanning in vertical direction of, on the average 3%, 16 further lines do not contribute to the image production. The effective number of visible lines is approximately 470. With a height of the image of $h$ cm., the distance between two successive scanning lines is approximately $h/470$ cm.

With the C.C.I.R. system (used in a large part of Europe), the number of lines of a complete image is 625. Due to frame blanking, in this case approximately 40 lines, and due to overscanning, approximately 19 lines do not contribute to the image production, so that the effective number of visible lines is approximately 566. With a height of the image $h$ cm., the distance between two successive scanning lines is approximately $h/566$ cm.

With the British system, the number of lines of a complete image is 405. Due to frame blanking in this case approximately 28 lines and due to overscanning approximately 12 lines do not contribute to the image production, so that the effective number of visible lines is approximately 365. With a height of the image of $h$ cm., the distance between two successive scanning lines is approximately $h/365$ cm.

With the French system (used in France and Belgium) the number of lines of a complete image is 819. Due to frame blanking, in this case approximately 82 lines and due to overscanning approximately 24 lines do not contribute to the image production, so that the effective number of visible lines is approximately 713. With a height of image of $h$ cm., the distance between two successive scanning lines is approximately $h/713$ cm.

If the apertures in the mask are arranged in vertical rows and if the number of visible apertures of the mask projected onto the display screen along the vertical axis is $m$, the distance on the screen between the projections of two successive apertures in the mask is $h/m-1$ cm.

In a known cathode-ray tube, the number of visible apertures in the mask projected on the display screen along the vertical axis is 540, so that the distance on the screen between the projections of two successive apertures in the mask is $h/539$ cm. The quotient of the line distance and the projected aperture distance is then for the R.T.M.A. system 539/470=1.15 which lies between the limits set for the quotient for $n=5$ (between $^{17}/_{16}$ and $^{19}/_{16}$) so that when this system is used, no disturbing moire patterns occur. These patterns do occur, however, with the use of the remaining three systems, since the quotients 541/566, 541/365 and 541/713 lie outside the said limits.

In an example of a cathode-ray tube according to the invention, the number of visible apertures in the mask projected onto the display screen along the vertical axis is 637 and the distance on the screen between the projections of two successive apertures in the mask is $h/636$ cm. The quotient of the line distance and the projected aperture distance is then for the R.T.M.A. system 636/470=1.35, which lies between the limits set for the quotient for $n=6$ (between $^{21}/_{16}$ and $^{23}/_{16}$). For the C.C.I.R. system, the quotient is 636/566=1.125, which is nine times ⅛. For the French system, the quotient is 636/713=0.89, which lies between the limits set for the quotient for $n=4$ (between $^{13}/_{16}$ and $^{15}/_{16}$). This tube can be used in these three systems without the occurrence of disturbing moire patterns.

In another example of a cathode-ray tube according to the invention, the number of visible apertures in the mask projected onto the display screen along the vertical axis is 496. The distance on the screen between the projections of two successive apertures in the mask is then $h/495$ cm. For the C.C.I.R. system, the said quotient is 495/566=0.875, which is seven times ⅛, while for the British system, this quotient is 495/365=1.35, which lies between the limits set for n=6 (between $^{21}/_{16}$ and $^{23}/_{16}$). In these two systems, no disturbing moire patterns occur in the tube operation. For a cathode-ray tube commercially available under the name of "25 inch tube" (which indicates that the outer diagonal dimension of the tube is approximately 25 inches), this means the following. The height $h$ of the image on the inner side of the window is in this case 398 mm. The distance on the screen between the projections of two successive apertures in the mask is then 398/495 mm.=804$\mu$. Since during operation of the tube, the distance between two successive electron spots of the same color exceeds by approximately 4% the distance between the corresponding apertures in the mask, in this case, the distance between two successive apertures in the mask is 773$\mu$. When the modifications resulting from the bulging of a flat mask (in practice approximately 1%, which also depends upon the position on the mask) are taken into account, it follows that basically a flat mask may be used having an aperture distance of 773$\mu$ . . . .

Figure 2:
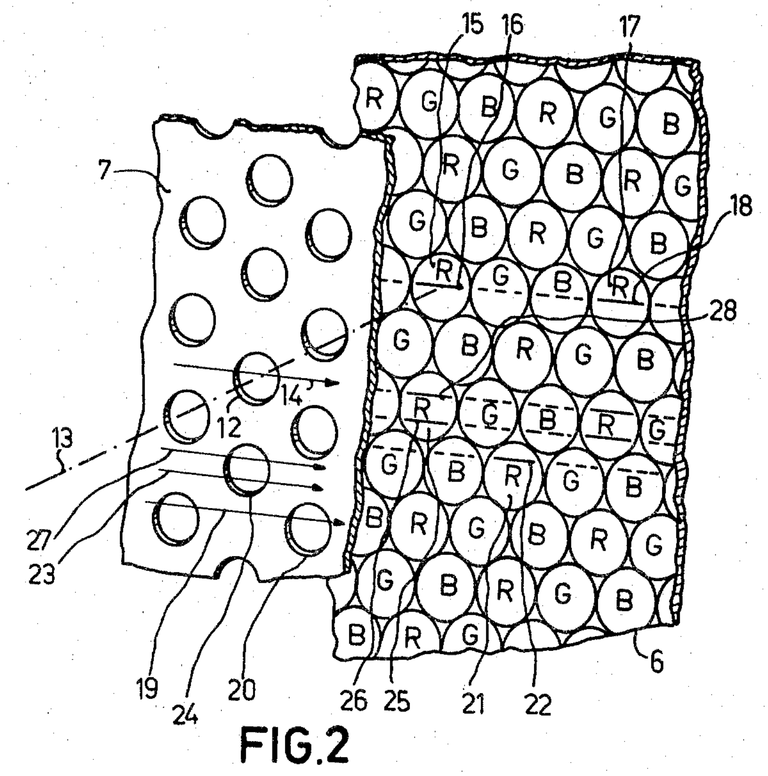

In order that the invention may be readily carried into effect, it will now be described in detail by way of example, with reference to the accompanying drawing, in which FIG. 1 is a view of a shadow mask colour tube which is partly broken away and FIG. 2 is an enlarged view of part of the shadow mask and the screen.

A shadow mask tube 1 comprises three electron guns 3, 4 and 5 in a neck 2. On the inner side of a face plate 6 a display screen is provided. The screen comprises blue, green and red phosphor dots. At a short distance from the face plate 6 a shadow mask 7 is arranged comprising apertures in a hexagonal pattern. These have not been represented to scale. A schematically indicated deflection system 8 deflects electron beams 9, 10 and 11 in two perpendicular directions.

FIG. 2 shows part of the face plate 6 provided with blue, green and red phosphor dots designated B, G and R respectively. Also part of the shadow mask 7 is shown. The axis 13 of the beam striking the red phosphor dots passes through the centre of the aperture 12 while scanning the screen in the direction 14. The axis 13 strikes the red phosphor dot 15 along the full line 16 and the red phosphor dot 17 along the full line 18. The shadow mask 7 prevents the axis of the beam from striking the green and blue phosphor dots along the dotted lines joining the lines 16 and 18. The figure illustrates the mentioned example of a cathode ray tube in which the number of visible apertures in the mask projected onto the display screen along the vertical axis is 637.

For the R.T.M.A. system the quotient of the line distance and the projected aperture distance is 1.35. The scanning line at which the axis of the beam intended for the red phosphor dots scans the mask 7 along line 14 is then followed by the scanning line at which the said axis scans the mask 7 along the line 19. After passing the aperture 20 the beam strikes the red phosphor dot 21, the axis of the beam striking it along the full line 22.

For the C.C.I.R. system the quotient of the line distance and the projected aperture distance is 1.125. Supposing that also in this case the axis 13 of the beam scans the mask 7 along the line 14, it is followed by the scanning line at which the axis scans the mask 7 along the line 23. After passing the aperture 24 the beam strikes the red phosphor dot 25, the axis of the beam striking it along the full line 26. For the French system the quotient of the line distance and the projected aperture distance is 0.89. Starting from the beam having an axis 13 which scans the mask 7 along the line 14, it is followed by the scanning line at which the axis scans the mask 7 along the line 27. After passing the aperture 24 the beam strikes the red phosphor dot 25, the axis of the beam striking it along the full line 28.

While the invention has been described with reference to particular embodiments and applications thereof, other modifications will be apparent to those skilled in the art without departing from the spirit and scope of the invention as defined in the appended claims.

What is claimed is:

1. A cathode-ray color dot which is provided with at least one electron gun producing a number of electron beams which scan in lines successively spaced apart on a display screen, a color selection electrode having systematically arranged apertures through which the electron beams strike parts of the display screen, the quotient of the distance between two successive scanning lines on the screen and the distance on the screen between the projections of two successive apertures in the color selection electrode lies for at least two distances between two successive scanning lines, which are different due to different numbers of scanning lines per image, between $$\frac{4n-3}{16 \cos \alpha}$$

and $$\frac{4n-1}{16 \cos \alpha}$$

$n$ being a natural number and $\alpha$ representing the minimum angle between the direction of the distance on the screen between the direction at right angles to the scanning lines and the projection of an aperture in one scanning line and the projection of an aperture in the succeeding scanning line in the color selection electrode, alpha having a value other than zero.

2. A cathode-ray tube as claimed in claim 1 in which the quotient is approximately $$\frac{1}{8 \cos \alpha}$$

3. A cathode-ray tube as claimed in claim 1 in which the quotient is an odd multiple of $$\frac{1}{8 \cos \alpha}$$

References Cited

UNITED STATES PATENTS 2,937,297 5/1960 Burdick.

ROBERT SEGAL, *Primary Examiner.*

U.S. Cl. X.R.

178—5.4; 313—85